United States Patent [19]

Riemer et al.

[11] Patent Number: 5,641,031
[45] Date of Patent: Jun. 24, 1997

[54] ARRANGEMENT OF A DRIVE UNIT IN AN ELECTRIC VEHICLE

[75] Inventors: Bernd Riemer, Stuttgart; Thomas Klaiber, Weinstadt, both of Germany

[73] Assignee: Daimler-Benz AG, Germany

[21] Appl. No.: 420,605

[22] Filed: Apr. 12, 1995

[30] Foreign Application Priority Data

Apr. 12, 1994 [DE] Germany ............... 44 12 450.3

[51] Int. Cl.⁶ ................................. B60K 1/04
[52] U.S. Cl. ........................... 180/65.3; 180/68.5
[58] Field of Search ................... 180/65.1, 65.3, 180/65.6, 65.8, 68.4, 68.5, 65.7

[56] References Cited

U.S. PATENT DOCUMENTS

| | | | |
|---|---|---|---|
| 4,365,681 | 12/1982 | Singh | 180/68.5 |
| 5,193,635 | 3/1993 | Mizuno et al. | 180/65.3 |
| 5,248,566 | 9/1993 | Kumar et al. | 180/65.3 |
| 5,251,721 | 10/1993 | Örtenheim | 180/298 |

FOREIGN PATENT DOCUMENTS

| | | |
|---|---|---|
| 1011256 | 6/1952 | France . |
| 2644666A1 | 4/1977 | Germany . |
| 5-16674 | 1/1993 | Japan ............... 180/68.5 |

OTHER PUBLICATIONS

"Die Brennstoffzelle als Energiequelle für Fahrzeugantriebe," Dr. Heinz G. Plust, ATZ, 69 Jahrgang, Nr. 6, Jun. 1967, pp. 175–183.
Patent Abstract of Japan, Publication No. JP 5–260611, Oct. 8, 1993.
European Search Report dated Jul. 26, 1995 (submitted with English translation of form).

Primary Examiner—Brian L. Johnson
Assistant Examiner—Frank Vanaman
Attorney, Agent, or Firm—Evenson, McKeown, Edwards & Lenahan P.L.L.C.

[57] ABSTRACT

An arrangement of a drive unit in a vehicle, having at least an electric traction motor, a fuel cell and a fuel tank. Two longitudinal beams situated at a distance from one another serve as supporting structure for the fuel-cell stack, which is mounted between the longitudinal beams in the underfloor region of the vehicle. Two transverse beams which extend at least over the region between the longitudinal beams may also be mounted at a distance from one another, so that a safety region is formed in which sensitive components of the drive unit can be protected against damage. The arrangement of individual components of the fuel-cell system in the underfloor region of the vehicle additionally provides the advantage that the passenger compartment or loading compartment can be of flat design.

3 Claims, 2 Drawing Sheets

ARRANGEMENT OF A DRIVE UNIT IN AN ELECTRIC VEHICLE

BACKGROUND AND SUMMARY OF THE INVENTION

The invention relates to an arrangement of a drive unit in an electric vehicle.

U.S. Pat. No. 5,193,635 discloses a vehicle which has a fuel-cell system and an electric traction motor, in which the entire fuel-cell system, comprising a reformer, the fuel-cell stack and two compressors, is mounted on a common frame and fit in the region of the center of gravity of the vehicle. In conventional vehicles, however, the passenger compartment is situated in the region of the center of gravity of the vehicle, and it is not possible to fit a complete fuel-cell system in this position without having an appreciable adverse effect on the space available for the occupants.

The object of the present invention is to provide an arrangement for a drive unit in an electric vehicle, in which at least sensitive components of the drive unit are protected against damage, without limiting the constructional space for the passenger compartment.

According to the invention, the object is achieved by the arrangement of the fuel cell in the underfloor region of the vehicle, between two longitudinal beams situated at a distance from one another. This arrangement has the advantage that the fuel cell is protected both in the longitudinal and in the transverse direction against damage resulting from an accident, and also that the floor of the passenger compartment above the longitudinal beams can be of flat design. In this way, the space offered to the occupants is not adversely affected at all.

As a result of the arrangement of two transverse beams, a kind of safety region is formed, improving the protection of sensitive drive components. Any hydrogen temporary reservoir present may also be fitted in the safety region.

Other objects, advantages and novel features of the present invention will become apparent from the following detailed description of the invention when considered in conjunction with the accompanying drawings.

DETAILED DESCRIPTION OF THE DRAWINGS

Figure 1A:
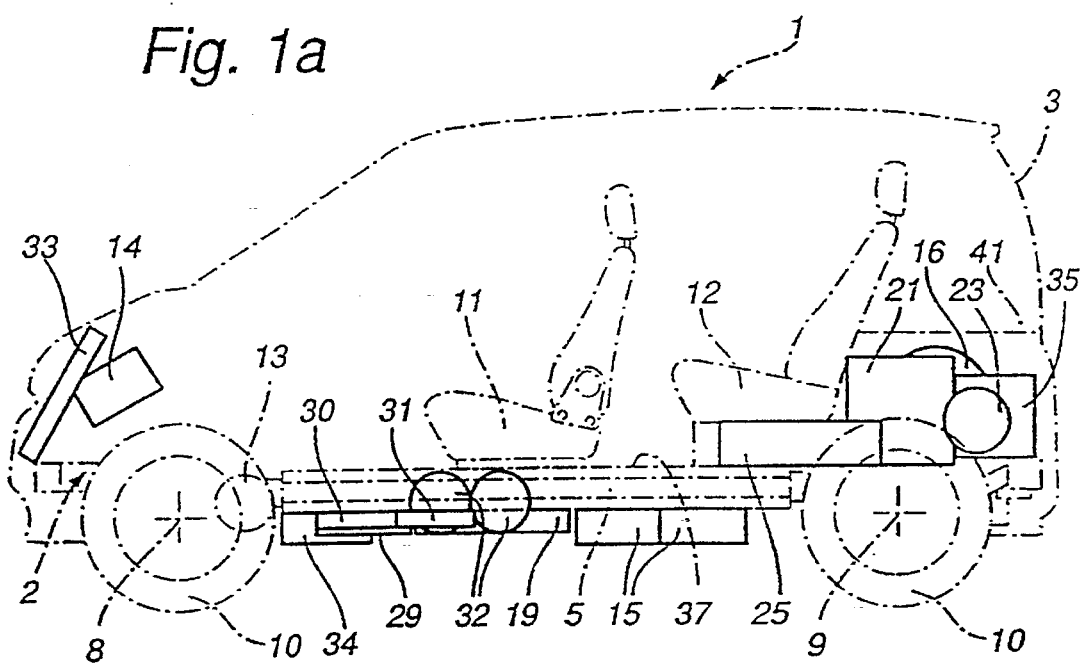
FIG. 1a shows a basic diagram of a vehicle construction according to the invention in a vertical longitudinal section.
Figure 1B:
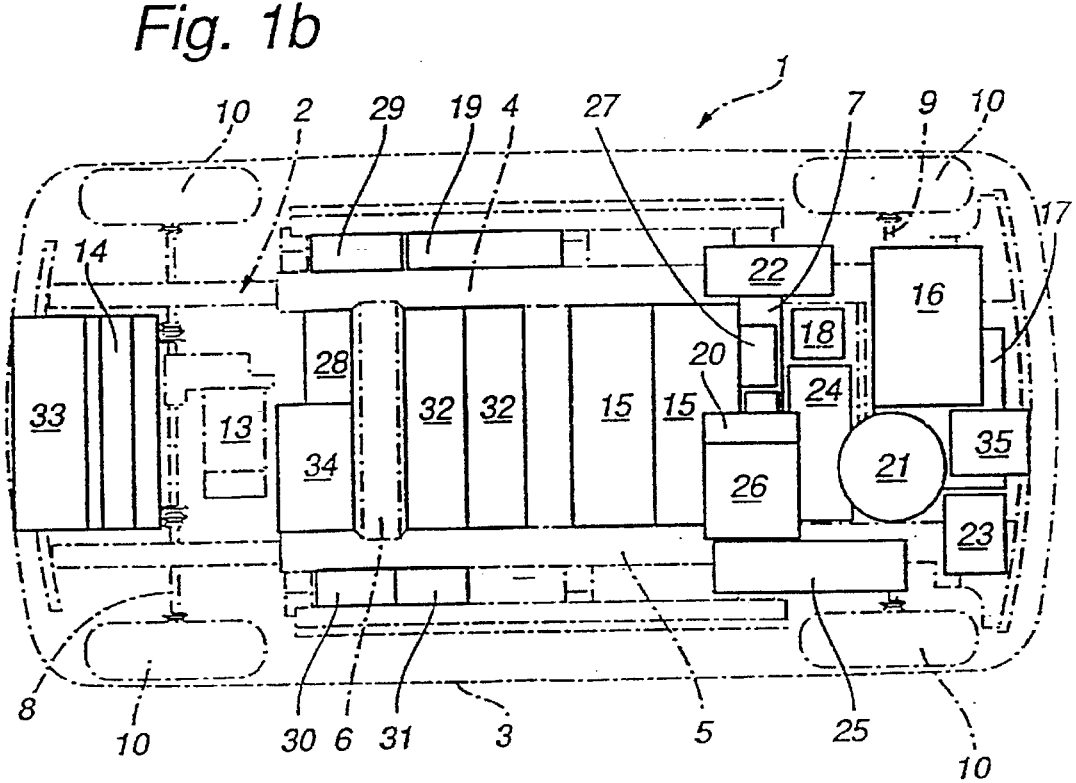
FIG. 1b shows the arrangement in FIG. 1a in a horizontal section.

The vehicle in FIG. 1, denoted as a whole by 1, has a body 3 supported by a vehicle frame 2, which comprises two longitudinal beams 4, 5 and two transverse beams 6, 7. Rotatably attached to the longitudinal beams 4, 5 are a front axle 8 and a rear axle 9, to which respective wheels 10 are fitted in each case. In addition, two front seats 11 and a rear bench-seat 12 are supported by the vehicle frame 2.

To drive the vehicle, an electric traction motor 13, whose power can be modified with the aid of a current controller 14, is fitted to the front axle. Electric power for the traction motor 13 is generated with the aid of a fuel-cell system, which comprises a fuel-cell stack 15 (having a multiplicity of individual fuel cells) a reformer 16, a fuel tank 17 and a multiplicity of auxiliary units 18–35. The operation of the fuel-cell system, for example a PEM fuel cell with methanol reformer, is generally known and is therefore described only briefly below.

Methanol stored in the fuel tank 17 and water from a water reservoir 18 are converted to a gaseous state in a vaporizer 19 and then fed to the reformer 16. In the reformer 16, essentially hydrogen, carbon dioxide and carbon monoxide are then formed from the methanol/water-vapor mixture, with heat being supplied with the aid of a catalytic burner 20. To reduce the carbon monoxide component, a CO oxidizer 21 may additionally be provided. The $H_2$-containing fuel gas is fed under pressure to the fuel-cell stack 15 with the aid of an H2 compressor 22. Moistened air is additionally fed under pressure to the fuel-cell stack by means of a further compressor 23 with associated electric motor 24. The fuel-cell stack uses the hydrogen and oxygen according to a process well known to those skilled in the art, to generate electric power, which is fed to the electric traction motor 13 via the current controller 14 to drive the vehicle 1.

A multiplicity of further auxiliary units, for example ion exchanger 25, air filter 26, condensate trap 27, equalization reservoir 28, water pump 29, reformate condenser 30, reformer heat exchanger 31, hydrogen temporary reservoir 32, fuel-cell radiator 33, and current controller 34 for electrical auxiliary components or moistener 35 may be necessary to operate the fuel-cell system. The operation of these auxiliary units is assumed to be known and is therefore not described further.

In order to accommodate such a multiplicity of components in a vehicle, it is advantageous if the units are designed as separate components, which can be distributed over the available installation positions. In this connection, it is particularly advantageous if important or particularly sensitive components are fitted at a protected installation position. In the arrangement described, a safety compartment is formed by the rectilinearly extending longitudinal and transverse beams 4–7. The fuel-cell stack 15 and the hydrogen temporary reservoir 32 are preferably arranged in this safety compartment. The reformer 16, including associated auxiliary units, and the fuel tank 17 are accommodated in the rear region of the vehicle. The fuel tank 17 is fitted, again for safety reasons, behind the rear axle 9 between the two longitudinal beams 4, 5. The reformer 16 can then be provided in the region of the rear axle 9 above the longitudinal beams 4, 5 and the fuel tank 17. The fuel-cell radiator 33 is mounted, in a known manner, in the front region of the vehicle 1, thereby ensuring an adequate supply of cooling air. The current controller 14 for the electric traction motor 13 can then be provided immediately behind the fuel-cell radiator 33.

Further auxiliary units can be distributed over the still vacant constructional space in the entire vehicle 1, for example also in the central region of the vehicle between the longitudinal beams 4, 5 and the lateral frame seal. In this connection, all the parts of the drive unit which are fitted in the central region of the vehicle may preferably be of underfloor design. As a result, the floor in the passenger compartment can be flat. Only in the front and rear region of the vehicle may auxiliary units be fitted above the longitudinal beams, so that the boot floor 41 is at a higher level only in the tail region.

Instead of the transverse arrangement shown at the front axle 8, the electric traction motor 13 may, of course, also be fitted at the rear axle 9 or in the longitudinal direction. In addition, two electric traction motors 13 may be provided near the wheels on the front or rear axle 8, 9.

Figure 2A:
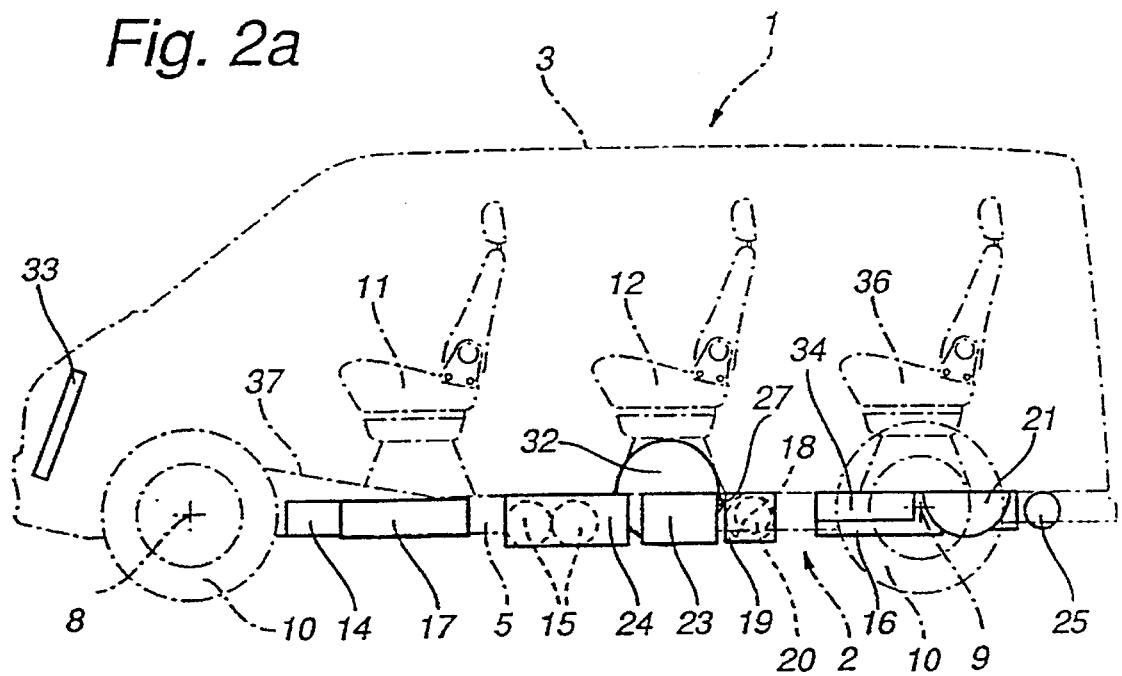
FIG. 2a shows a second representative embodiment of an arrangement according to the invention in a vertical longitudinal section.
Figure 2B:
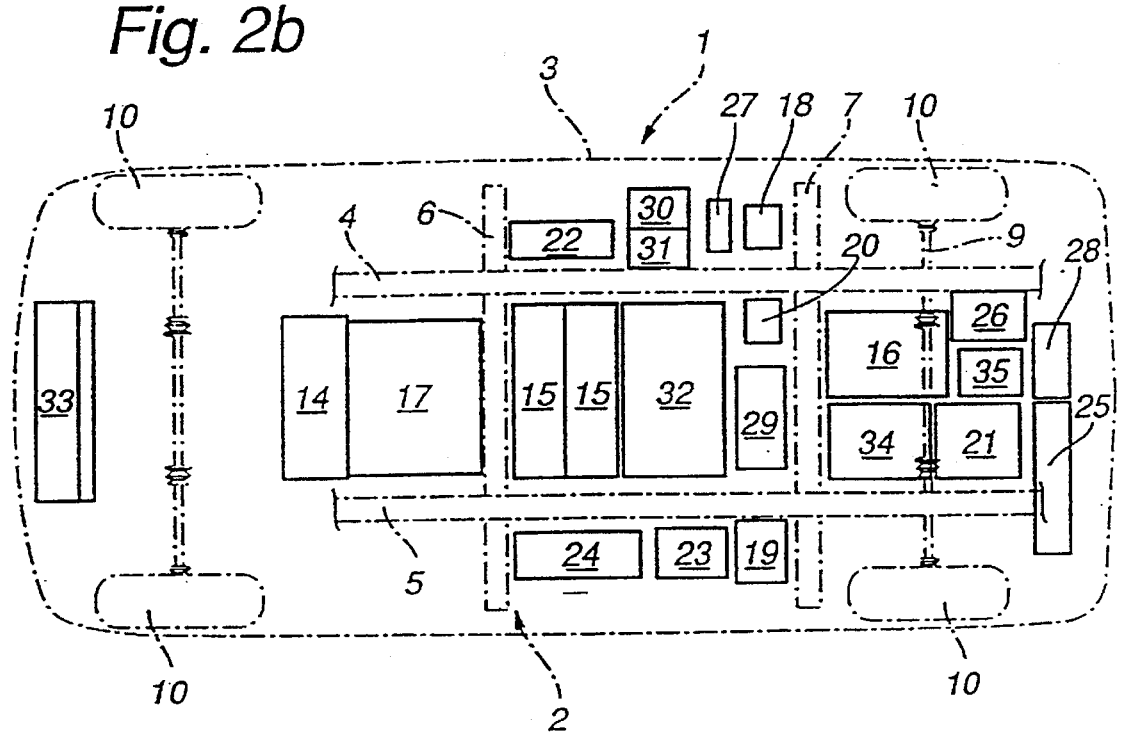
FIG. 2b shows the arrangement in FIG. 2a in a horizontal section.

FIG. 2 shows a similar arrangement for a mini van or a transporter having three rows of seats 11, 12, 36. Parts identical to those in FIG. 1 are denoted by identical reference symbols. In this arrangement, in contrast to FIG. 1, the fuel tank 17 is mounted in the region of the front seats 11 between the longitudinal beams 4, 5. In addition, the current controllers 14, 34 are provided not at the front of the vehicle, but behind the front axle 8 and in front of the rear axle 9, in each case between the longitudinal beams 4, 5. In this arrangement, the reformer 16 and the auxiliary units grouped in the rear section of the vehicle are also fitted in the underfloor region, so that the floor of the passenger compartment 37 can be flat over the entire region.

In the case of underfloor arrangements, it is possible to mount the drive units in a trough or an auxiliary frame, in which case it is possible to install them from below or through the floor of the passenger compartment 37. Also, the floor of the passenger compartment 37 or the vehicle underfloor has suitable cutouts or hinged maintenance covers for assembly or maintenance.

In the case of a fuel-cell system without reformer 16, the fuel tank or tanks 17 may also be fitted in the region of the vehicle roof or in the boot.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement of a drive unit in a vehicle, which drive unit comprises at least an electric traction motor, a fuel cell connected to supply electric power to the traction motor, and a fuel tank connected to the fuel cell, the fuel cell being mounted on a supporting structure for a floor of the vehicle in a position between wheels of the vehicle, wherein:

the supporting structure comprises two longitudinal beams mounted under said vehicle floor at a distance from one another and two transverse beams which are situated at a distance from one another and extend between said longitudinal beams transversely to a direction of travel of the vehicle; and the fuel cell is mounted in an underfloor region of the vehicle between the longitudinal beams, in a safety region defined by the longitudinal and the transverse beams;

said arrangement further comprising a plurality of auxiliary units for the fuel cell, which units are mounted in the underfloor region outside the longitudinal beams between the transverse beams.

2. Arrangement according to claim 1 further comprising a hydrogen temporary reservoir which is in the underfloor region between the longitudinal and transverse beams and is connected to a fuel supply of said fuel cell.

3. Arrangement according to claim 1 wherein the fuel tank is mounted behind the rear transverse beam relative to a direction of forward travel of the vehicle, in the region between the longitudinal beams.

* * * * *